No. 811,056. PATENTED JAN. 30, 1906.
G. F. GREEN.
COOKING STOVE ATTACHMENT.
APPLICATION FILED MAR. 6, 1905.

2 SHEETS—SHEET 1.

Witnesses
Forrest L. Smith
C. H. Griesbauer

Inventor
G. F. Green
by H. B. Willson
Attorney

No. 811,056. PATENTED JAN. 30, 1906.
G. F. GREEN.
COOKING STOVE ATTACHMENT.
APPLICATION FILED MAR. 6, 1905.

2 SHEETS—SHEET 2.

Witnesses
Forrest G. Smith
C. H. Griesbauer

Inventor
G. F. Green
by H. B. Wilson
Attorney

UNITED STATES PATENT OFFICE.

GEORGE F. GREEN, OF BAZETTE, TEXAS, ASSIGNOR OF ONE-HALF TO ERNEST S. JONES, OF KERENS, TEXAS.

COOKING-STOVE ATTACHMENT.

No. 811,056.  Specification of Letters Patent.  Patented Jan. 30, 1906.

Application filed March 6, 1905. Serial No. 243,610.

*To all whom it may concern:*

Be it known that I, GEORGE F. GREEN, a citizen of the United States, residing at Bazette, in the county of Navarro and State of Texas, have invented certain new and useful Improvements in Cooking-Stove Attachments; and I do declare the following to be a full, clear, and exact description of the invention, such as will enable others skilled in the art to which it appertains to make and use the same.

This invention relates to attachments for cooking-stoves.

The object of the invention is to provide an attachment to be placed in the ovens of cooking-stoves to prevent food therein from being burned while cooking.

A further object is to provide means whereby moisture is supplied to the oven, thus preventing the blistering of bread while baking and improving the general baking and roasting qualities of the oven.

With the above and other objects in view the invention consists of certain novel features of construction, combination, and arrangement of parts, as will be hereinafter described and claimed.

Figure 1:
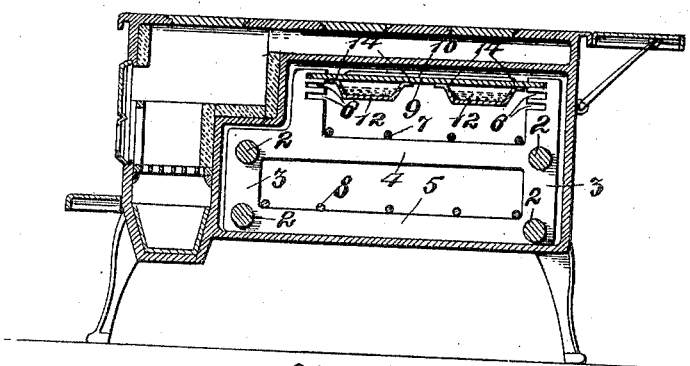
Figure 2:
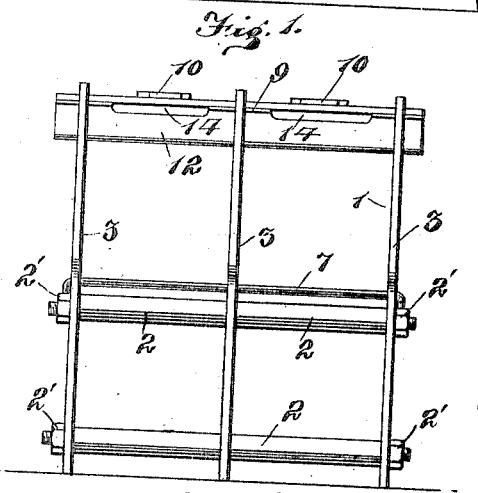
Figure 3:
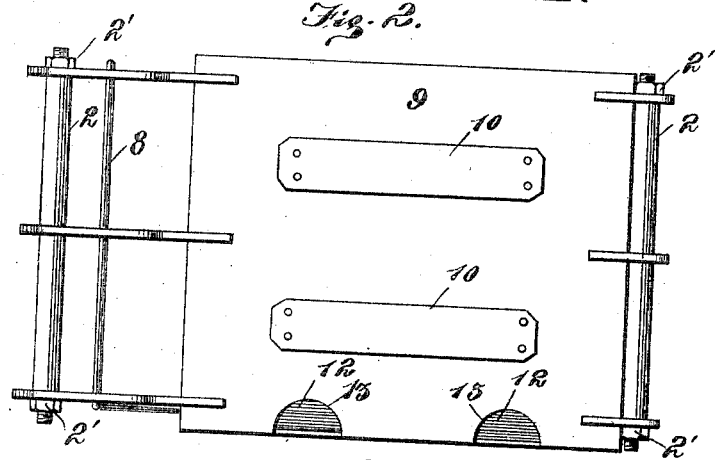
Figure 4:
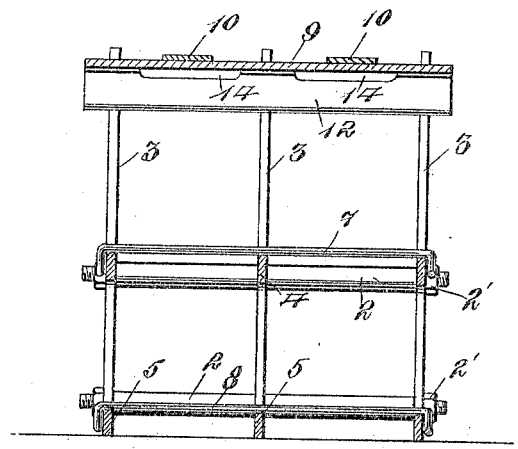
Figure 5:
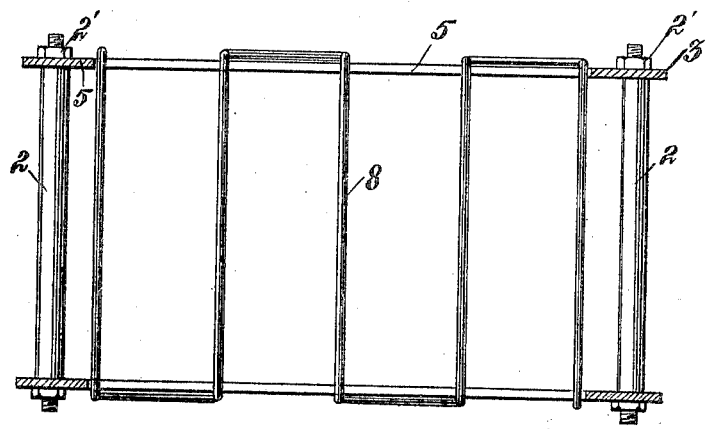

In the accompanying drawings, Figure 1 is a longitudinal vertical section through a stove, showing the device arranged in the oven of the same. Fig. 2 is an end view of the attachment removed from the oven. Fig. 3 is a top plan view of the same. Fig. 4 is a central transverse vertical sectional view, and Fig. 5 is a horizontal sectional view.

Referring more particularly to the drawings, 1 denotes a series of counterpart supporting-frames which are spaced apart and connected together by means of shouldered bolts 2, on the threaded ends of which adjacent to and engaging the outer frame is screwed nuts 2'. There may be any desired number of the frames 1, and they are of suitable size and shape to fit within the oven in which they are intended to be used.

Each of the frames 1 consists of vertically-disposed end bars or standards 3, which are connected together by upper and lower integrally-formed cross-bars 4 and 5. The standards 3 are extended above the upper cross-bar 4, and in the inner edges of the upwardly-extended portions of the standards are formed a series of horizontally-disposed notches or recesses 6. On the upper cross-bars 4 is disposed a shelf 7, and on the lower cross-bars is disposed a shelf 8, said shelves 7 and 8 being each preferably formed of a single wire rod or bar bent back and forth upon itself to form a rack. The ends of said racks are bent downwardly at right angles to form overhanging hooked portions which engage the cross-bars of the outer frame, thereby holding the racks or shelves in place.

In the upper portions of the frames 1 between the extended ends of the standards 3 is arranged a fender-plate 9, the edges of which are engaged with notches 6 in the upper ends of said standards and by which means said plate may be supported at various levels above the upper rack or shelf 7. The fender-plate 9 is preferably formed of thin sheet metal, and on the upper side of the same is arranged two or more transversely-disposed brace-bars 10 to give rigidity to said plates. Secured to the under side of the plate 9 are longitudinally-disposed water-pans 12, of which there may be any desired number, two of the same being shown in the present instance. The front edge of the fender-plate 9 above each water-pan is cut out, as shown at 13, to form filling-openings through which water may be introduced into the pans. The upper edge of each side of the pans adjacent to the under side of the fender-plate is cut away to form openings 14, through which the water in the pans may be evaporated, thus keeping the air in the oven in a moist condition, which greatly facilitates the baking or roasting of certain food.

An attachment of this character may be quickly applied to and removed from an oven and when in use will be found to greatly increase the baking and roasting qualities of the oven.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In an attachment for cooking-stoves, the combination with a series of supporting-frames secured together adapted to be inserted into an oven and having supporting notches or recesses in their upper sides, of open wire shelves or racks supported by said frames, a fender-plate adapted to engage the supporting notches or recesses in the upper ends of said frames whereby said plate is adjustably supported above said racks, and water-pans connected to the under side of said plate, substantially as described.

2. In an attachment for cooking-stoves, the combination with a series of supporting-frames secured together adapted to be inserted into an oven and having supporting notches or recesses in their upper sides, of open wire shelves or racks supported by said frames, a fender-plate adapted to engage the supporting notches or recesses in the upper ends of said frames whereby said plate is adjustably supported above said racks, water-pans connected to the under side of said plate, said pans being cut away at their upper side edges to form discharge-openings through which the water in said pans evaporates, and means whereby said pans may be filled, substantially as described.

3. In an attachment of the character described, the combination with a series of open supporting-frames, spaced apart and held together by means of shouldered bolts and clamping-nuts and having supporting notches or recesses in their upper sides, of upper and lower pan-racks each formed of a single piece of wire bent to form an open shelf having right-angularly-bent ends to engage the outer supporting-frames, a suitably-braced sheet-metal fender-plate adapted to engage one pair of the said supporting-notches formed in the upper ends of each of said supporting-frames, whereby said plate may be supported at different levels above said pan-shelves, and water-pans connected to the under side of said fender-plate, substantially as described.

In testimony whereof I have hereunto set my hand in presence of two subscribing witnesses.

GEORGE F. GREEN.

Witnesses:
W. D. SESSIONS,
GEO. W. ELLISON.